United States Patent
Choi et al.

(10) Patent No.: US 11,671,143 B2
(45) Date of Patent: Jun. 6, 2023

(54) TRANSMITTER, DATA COMMUNICATION DEVICE INCLUDING SAME, AND DATA TRANSMISSION METHOD

(71) Applicant: SAMSUNG ELECTRONICS CO., LTD., Suwon-si (KR)

(72) Inventors: Jaehyurk Choi, Jeonju-si (KR); Jiwoon Park, Suwon-si (KR); Kwangsoo Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/473,057

(22) Filed: Sep. 13, 2021

(65) Prior Publication Data
US 2022/0329283 A1    Oct. 13, 2022

(30) Foreign Application Priority Data
Apr. 13, 2021    (KR) .................... 102021-0047664

(51) Int. Cl.
*H04B 3/32*    (2006.01)
*H04B 1/02*    (2006.01)
*H04B 1/06*    (2006.01)

(52) U.S. Cl.
CPC ............... *H04B 3/32* (2013.01); *H04B 1/02* (2013.01); *H04B 1/06* (2013.01)

(58) Field of Classification Search
CPC ............... H04B 1/02; H04B 1/06; H04B 3/32
See application file for complete search history.

(56) References Cited

U.S. PATENT DOCUMENTS

| | | |
|---|---|---|
| 5,130,564 A | 7/1992 | Sin |
| 5,196,733 A | 3/1993 | Shin |
| 7,773,709 B2 | 8/2010 | Lee |
| 7,995,406 B2 | 8/2011 | Lee |
| 8,259,519 B2 | 9/2012 | Lee |
| 8,588,331 B2 | 11/2013 | Jung et al. |
| 8,730,705 B1 | 5/2014 | Stephens, Jr. |
| 8,913,443 B2 | 12/2014 | Pyeon |
| 9,324,385 B2 | 4/2016 | Moon |
| 10,236,042 B2 | 3/2019 | Eaton et al. |
| 2005/0195928 A1* | 9/2005 | Yamazaki ............ G06F 1/10 375/354 |

FOREIGN PATENT DOCUMENTS

| | | |
|---|---|---|
| KR | 1029920003649 A | 2/1992 |
| KR | 1019930003537 A | 2/1993 |

* cited by examiner

*Primary Examiner* — David S Huang
(74) *Attorney, Agent, or Firm* — Volentine, Whitt & Francos, PLLC

(57) ABSTRACT

A transmitter includes output drivers respectively corresponding to data transmission lines, driver control logic configured to control the output drivers in response to data pattern information, and a data pattern detector configured to detect a data pattern in relation to at least two data transmission lines among the data transmission lines over a predetermined period of time, and output the data pattern information corresponding to the data pattern.

10 Claims, 22 Drawing Sheets

|  | Even | Half_Even | 0 | Half_ODD | ODD |
|---|---|---|---|---|---|
| DQPI | A | B | C | D | E |

FIG. 9A

| Input | | | Output |
|---|---|---|---|
| DQ_N-1 | DQ_N | DQ_N+1 | DQ_N_Control |
| $t_0t_1$ | $t_0t_1$ | $t_0t_1$ | |
| 00 | 01 | 00 | C |
| 00 | 01 | 01 | B |
| 00 | 01 | 10 | D |
| 00 | 01 | 11 | C |
| 01 | 01 | 00 | B |
| 01 | 01 | 01 | A |
| 01 | 01 | 10 | C |
| 01 | 01 | 11 | B |
| 10 | 01 | 00 | D |
| 10 | 01 | 01 | C |
| 10 | 01 | 10 | E |
| 10 | 01 | 11 | D |
| 11 | 01 | 00 | C |
| 11 | 01 | 01 | B |
| 11 | 01 | 10 | D |
| 11 | 01 | 11 | C |
| 00 | 10 | 00 | C |
| 00 | 10 | 01 | D |
| 00 | 10 | 10 | B |
| 00 | 10 | 11 | C |
| 01 | 10 | 00 | D |
| 01 | 10 | 01 | E |
| 01 | 10 | 10 | C |
| 01 | 10 | 11 | D |
| 10 | 10 | 00 | B |
| 10 | 10 | 01 | C |
| 10 | 10 | 10 | A |
| 10 | 10 | 11 | B |
| 11 | 10 | 00 | C |
| 11 | 10 | 01 | D |
| 11 | 10 | 10 | B |
| 11 | 10 | 11 | C |

FIG. 9B

TRANSMITTER, DATA COMMUNICATION DEVICE INCLUDING SAME, AND DATA TRANSMISSION METHOD

CROSS-REFERENCE TO RELATED APPLICATION

This application claims priority under 35 U.S.C. § 119 to Korean Patent Application No. 10-2021-0047664 filed on Apr. 13, 2021 in the Korean Intellectual Property Office, the subject matter of which is hereby incorporated by reference in its entirety.

BACKGROUND

The inventive concept relates generally to transmitters, data communication devices including at least one transmitter, and data transmission methods.

Crosstalk is a type of electronic noise. Crosstalk is often caused by signal timing jitter due to coupling of neighboring (e.g., parallel) transmission lines. In the case of a micro-strip line on a printed circuit board (PCB), inductive coupling may be greater than capacitive coupling. Accordingly, when data being transmitted at a transmitting end of one transmission line transitions from low to high, negative crosstalk may be generated at a reception end of another neighboring transmission line. Analogously, when data being transmitted at a transmitting end of one transmission line transitions from high to low, positive crosstalk may be generated at a reception end of another neighboring transmission line.

Crosstalk tends to degrade the quality of data signals being communicated over data transmission lines. Accordingly, approaches are sought to minimize crosstalk.

SUMMARY

Embodiments of the inventive concept provide transmitters generating reduced crosstalk, data communication devices including such transmitters, and related data transmission methods.

According to an aspect of the inventive concept, a transmitter includes; output drivers respectively corresponding to data transmission lines, driver control logic configured to control the output drivers in response to data pattern information, and a data pattern detector configured to detect a data pattern in relation to at least two data transmission lines among the data transmission lines over a predetermined period of time, and output the data pattern information corresponding to the data pattern.

According to another aspect of the inventive concept, a data transmission method includes; requesting, from a transmitter to a receiver, a training operation in relation to data patterns associated with data transmission lines, performing the training operation in the receiver to generate delay information, sending the delay information from the receiver to the transmitter, setting registers in the transmitter respectively corresponding to the data transmission lines using the delay information, determining a data pattern to be transmitted via the data transmission lines, controlling timing of output drivers in the transmitter respectively corresponding to the data transmission lines in accordance with set values of the registers corresponding to the data pattern, and outputting data from the transmitter to the receiver using the output drivers.

According to another aspect of the inventive concept, a data communication device includes; a transmitter including output drivers respectively connected to data transmission lines, a data pattern detector configured to detect a data pattern associated with at least one of the data transmission lines and to provide data pattern information corresponding to the data pattern, and driver control logic configured to control the output drivers in response to the data pattern information, and a receiver including reception drivers respectively connected to the data transmission lines.

BRIEF DESCRIPTION OF DRAWINGS

The above and other aspects, features, and advantages of the inventive concept may be more clearly understood upon consideration of the following detailed description together with the accompanying drawings, in which:

FIGS. 9A and 9B are conceptual control table diagrams illustrating exemplary data pattern information DQPI generated by the pattern compare units of FIG. 8;

DETAILED DESCRIPTION

Throughout the written description and drawings, like reference numbers and labels are used to denote like or similar elements, components and/or features.

Figure 1:
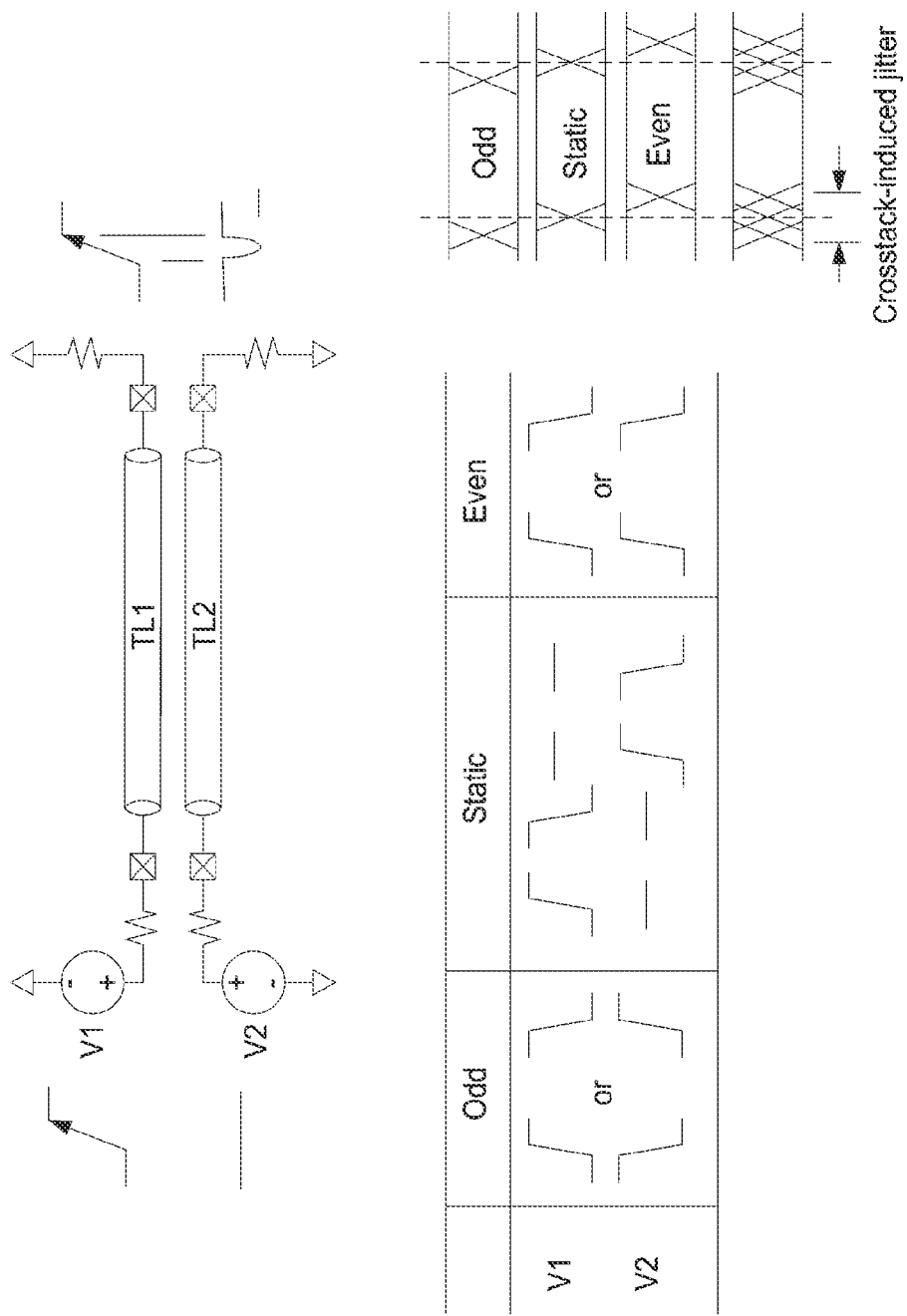
FIG. 1 is a conceptual diagram illustrating a data mode likely to generate crosstalk in a general transmission line.

FIG. 1 is a conceptual diagram illustrating a data mode likely to generate crosstalk in a general transmission line.

Referring to FIG. 1, when mutually independent signals V1 and V2 are respectively applied to transmission lines TL1 and TL2, a case in which the signals V1 and V2 change in the same direction over time is called an even mode, a case in which the signals V1 and V2 change in opposite directions over time is called an odd mode, and all other cases are called a static mode. In the even mode, a signal change over time is delayed for crosstalk of a receiving end, and in the odd mode, a signal change over time is fast for crosstalk of the receiving end in the odd mode. That is, in the even mode case, signal transmission time may slightly increase, and in the odd mode case, signal transmission time may slightly decrease due to crosstalk-induced jitter.

Figure 2:
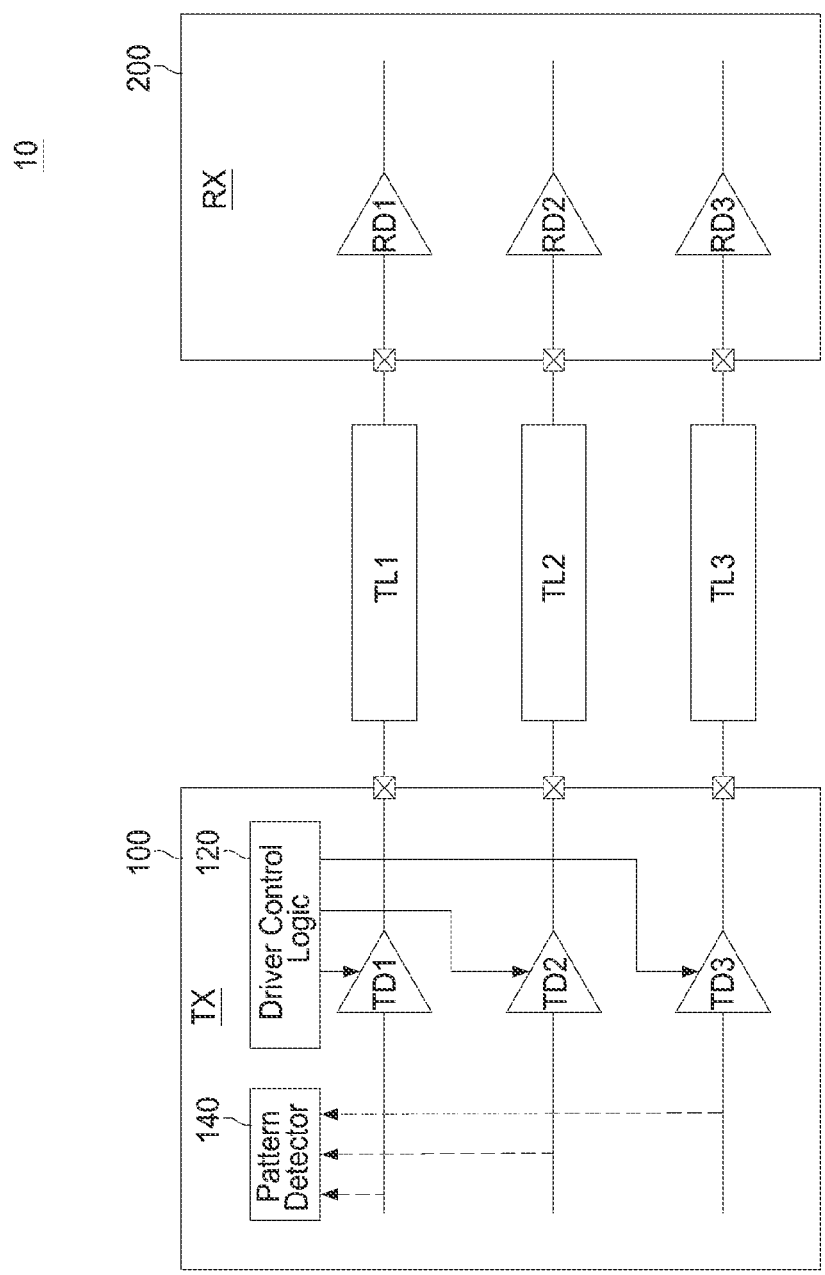
FIG. 2 is a block diagram illustrating a data communication device according to embodiments of the inventive concept.

FIG. 2 is a block view illustrating a data communication device 10 according to embodiments of the inventive concept. Referring to FIG. 2, the data communication device 10 may include a transmitter (TX) 100 and a receiver (RX) 200. The transmitter 100 may transmit data to the receiver 200 through multiple transmission lines (e.g., transmission lines TL1, TL2, and TL3). In the illustrated example of FIG. 2, the number of output drivers, transmission lines, and reception drivers is assumed to be three (3), although this is just a convenient example and the inventive concept is not limited thereto.

Thus, the transmitter 100 may include output drivers TD1, TD2, and TD3, as well as driver control logic 120, and a data pattern detector (or pattern detector) 140. Here, each of the output drivers TD1, TD2, and TD3 may be respectively implemented to output data to a corresponding one of the transmission lines TL1, TL2, and TL3.

The driver control logic 120 may be implemented to control each of the output drivers TD1, TD2, and TD3. In this regard, the driver control logic 120 may control clock delay(s), data delay(s), slew rate(s), and/or signal driving strength for each of the output drivers TD1, TD2, and TD3 according to one or more data pattern(s).

The data pattern detector 140 may be implemented to detect data input to the output drivers TD1, TD2, and TD3 to further detect a data pattern associated with the input data. Here, for example, the data pattern may be a pattern related to a data mode, such as the one described in FIG. 1. For example, the data pattern may be any one of an even mode pattern, an odd mode pattern and a static mode pattern. The data pattern detector 140 may be variously implemented in hardware, software and/or firmware.

The receiver 200 may include reception drivers RD1, RD2, and RD3 respectively corresponding to the transmission lines TL1, TL2, and TL3.

Hence, the data communication device 10 may include the transmitter 100 controlling the output drivers TD1, TD2, and TD3 according to a data pattern, thereby minimizing jitter due to the influence of crosstalk on the respective transmission lines TL1, TL2 and TL3.

Figure 3A:
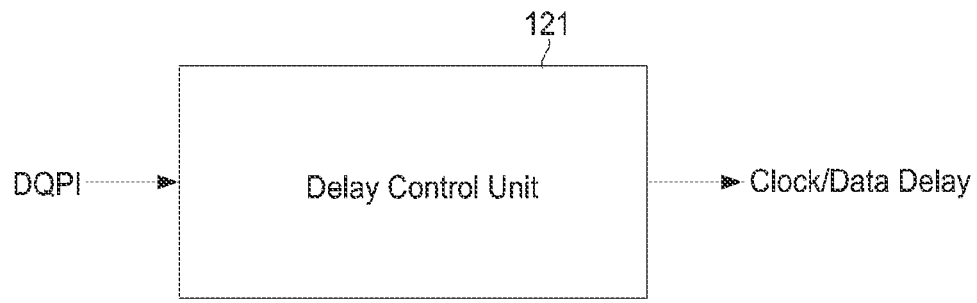
FIGS. 3A and 3B are respectively block diagrams illustrating a delay control unit 121 that may be included in the driver control logic 120 of FIG. 2.
Figure 3B:
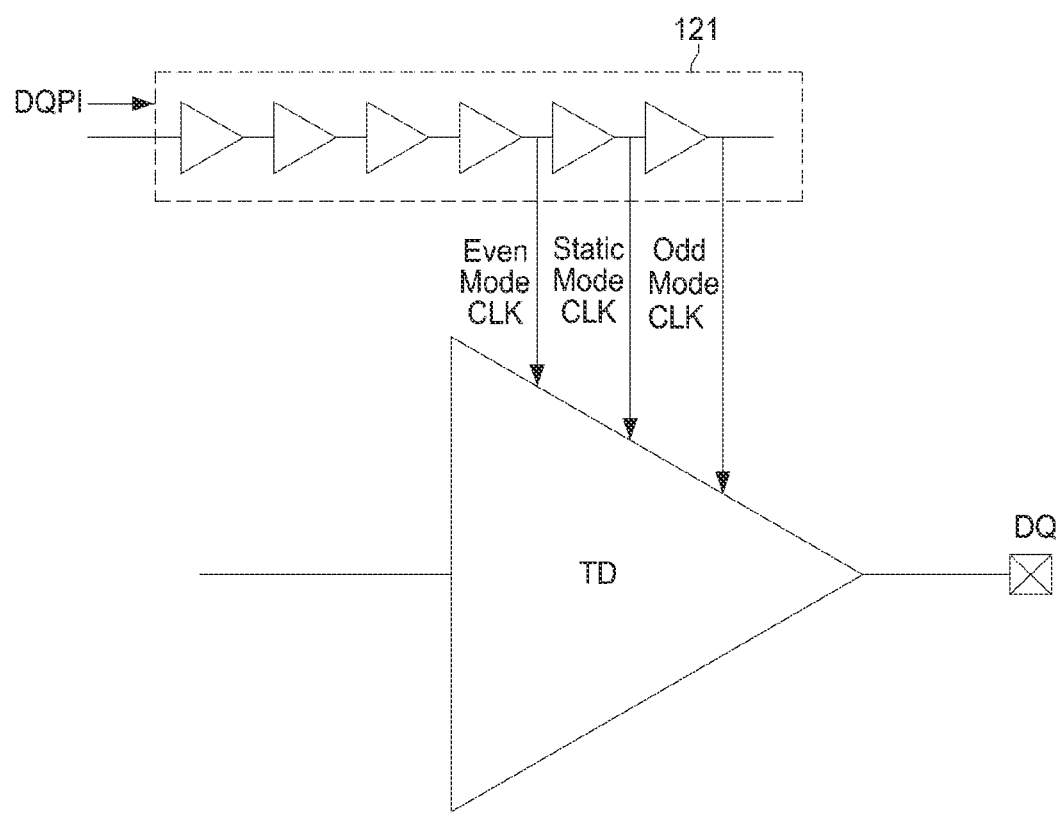

FIGS. 3A and 3B are respectively block diagrams illustrating a delay control unit 121 that may be included in the driver control logic 120 of FIG. 2.

Referring to FIG. 2 and FIG. 3A, the driver control logic 120 may include the delay control logic 121 which is configured to receive data pattern information DQPI and variously delay clock and/or data signals (hereafter, "clock/data signals") in response to the DQPI.

Additionally referring to FIG. 3B, the delay control logic 121 may output different delay clocks in response to the data pattern information DQPI. For example, the delay control logic 121 may output at least one of an even mode clock, a static mode clock, and an odd mode clock in response to the data pattern information DQPI. In some embodiments, the even mode clock may be relatively faster than the static mode clock, and the static mode clock may be relatively faster than the odd mode clock. The output driver TD may output data DQ in response to the particular clock provided (e.g., output) by the delay control logic 121.

Thus, when the data pattern information DQPI indicates the even mode, the delay control logic 121 may output the even mode clock so that the data DQ may be output more quickly in consideration of a signal delay in the receiver 200. And when the data pattern information DQPI indicates the odd mode, the delay control logic 121 may output the odd mode clock so that the data DQ may be output more slowly in consideration of a fast signal response in the receiver 200.

Figure 4A:
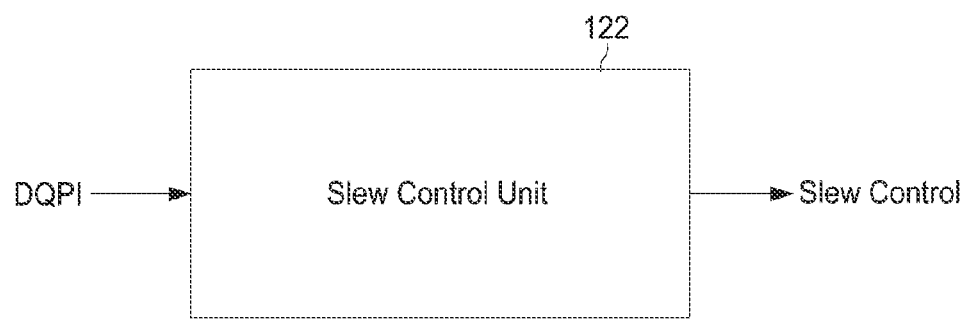
FIG. 4A is a block diagram and FIGS. 4B and 4C are respective signal timing diagrams illustrating operation of a slew control unit 122 that may be included in the driver control logic 120 of FIG. 2.
Figure 4B:
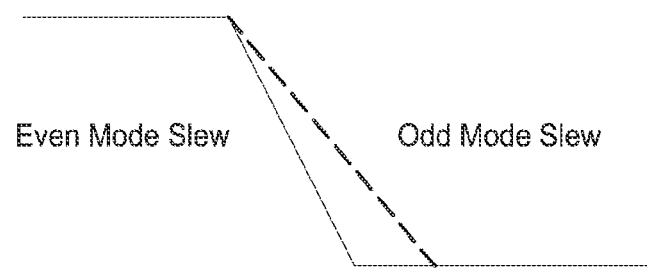
Figure 4C:
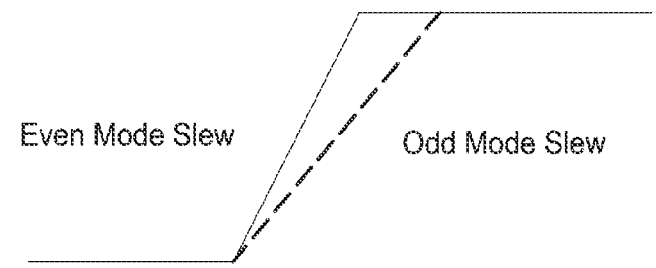

FIG. 4A is a block diagram and FIGS. 4B and 4C are respective signal timing diagrams illustrating operation of a slew control unit 122 that may be included in the driver control logic 120 of FIG. 2.

Referring to FIGS. 2, 4A, 4B and 4C, the driver control logic 120 may include a slew control unit 122 configured to receive the data pattern information DQPI and variously control clock/data slewing in response to the DQPI. As shown in FIGS. 4B and 4C, the slew control unit 122 may control different slews (e.g., an even mode slew and an odd mode slew) in response to the data pattern information DQPI. In some embodiments, the even mode slew (or signal waveform inclination) may be greater than that of the odd mode slew.

In some embodiments, when the data pattern information DQPI indicates the even mode, the slew control logic 122 may output data DQ having an even mode slew in relation to a signal delay in the receiver 200. And when the data pattern information DQPI indicates the odd mode, the slew control logic 122 may output data DQ having an odd mode slew in relation to a fast signal response in the receiver 200.

Figure 5A:
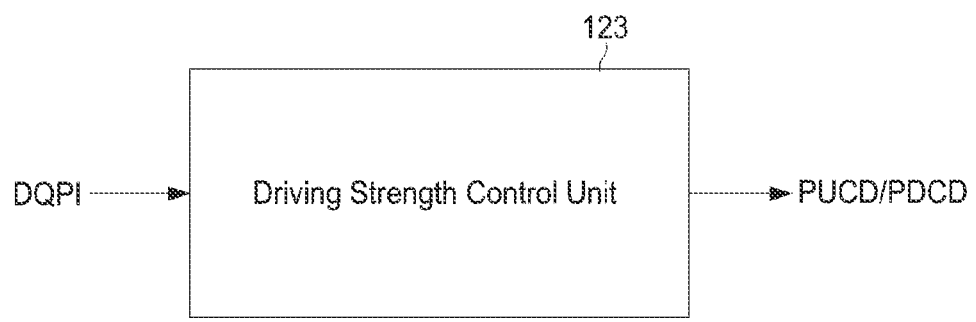
FIGS. 5A and 5B are respective block diagrams illustrating a driving strength control unit 123 that may be included in the driver control logic 120 of FIG. 2.
Figure 5B:
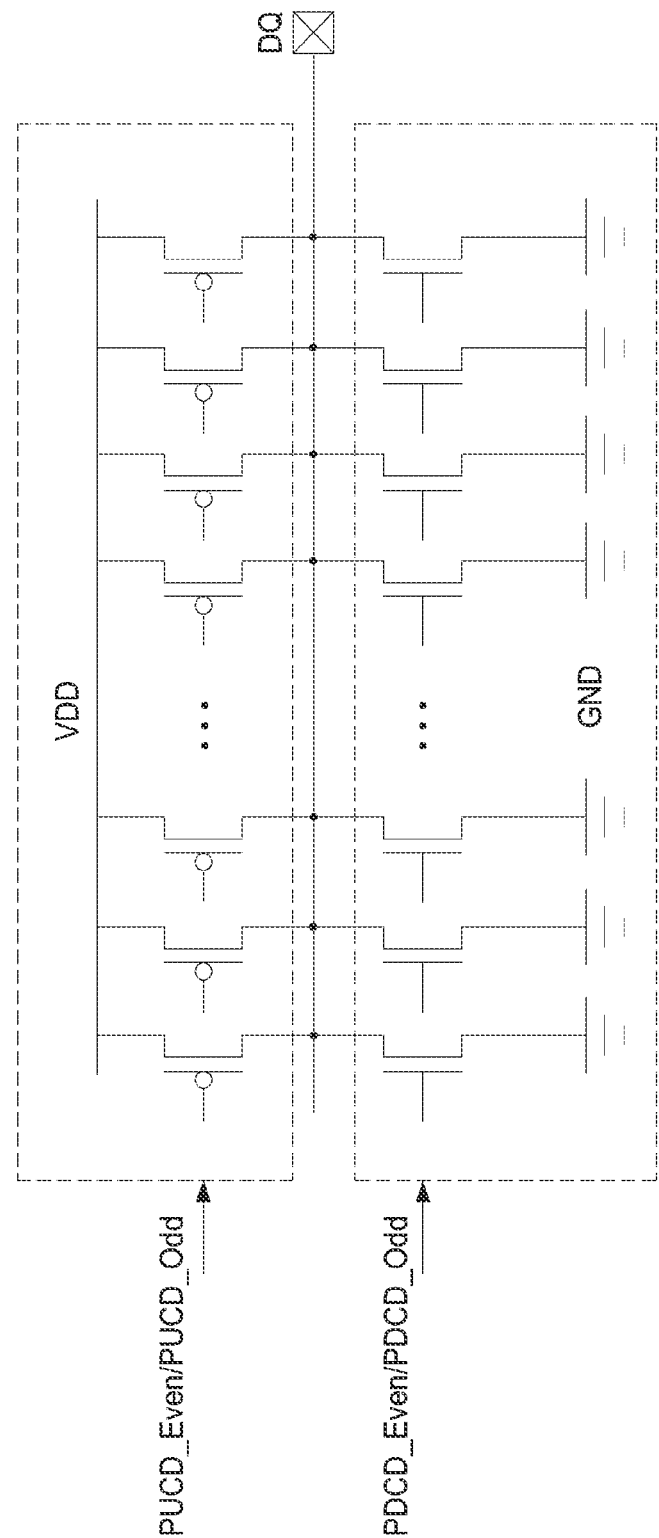

FIGS. 5A and 5B are respective block diagrams illustrating a driving strength control unit 123 that may be included in the driver control logic 120 of FIG. 2.

Referring to FIGS. 2 and 5A, the driver control logic 120 may include the driving strength control unit 123 configured to receive the data pattern information DQPI and controlling a driving strength for an output signal (DQ) in response to the DQPI.

As shown in FIG. 5B, the driving strength control unit 123 may output a pull-up code (PUCD)/pull-down code (PDCD) in response to the data pattern information DQPI. In some embodiments, when the data pattern information DQPI indicates the even mode, the driving strength control unit 123 may output an even mode pull-up code PUCD_Even, or even mode pull-down code PDCD_Even in relation to a signal delay in the receiver 200. In some embodiments, when the data pattern information DQPI indicates the odd mode, the driving strength control logic 123 may output an odd mode pull-up code PUCD_Odd or an odd mode pull-down code PDCD_Odd in relation to a fast signal response in the receiver 200.

Figure 6:
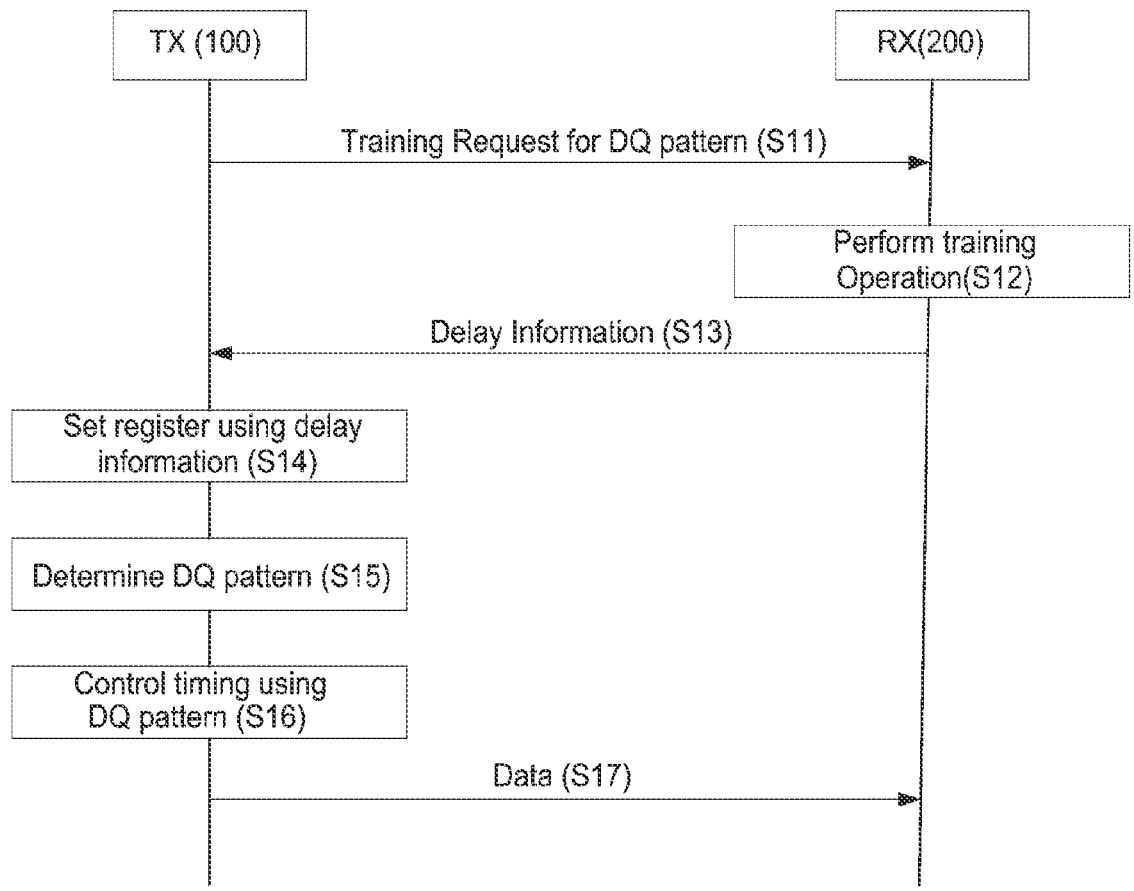
FIG. 6 is a flowchart illustrating an operating method for the data communication device of FIG. 2.

FIG. 6 is a flowchart illustrating an operating method for the data communication device 10 of FIGS. 2, 3A, 3B, 4A, 4B, 4C, 5A and 5B (hereafter collectively, "FIGS. 2 to 5B") according to embodiments of the inventive concept. Referring to FIGS. 2 to 5B and FIG. 6, the data communication device 10 may operate as follows.

The transmitter TX 100 may request training for a data pattern from the receiver RX 200 (S11), and the receiver 200, upon receiving the training request, may perform a training operation for the data pattern (S12). Here, the training operation may include detecting a timing delay for a specific data pattern for each of the transmission lines, such that delay information may be generated as a result of the training operation.

Accordingly, the receiver 200 may transmit delay information (S13) in response to the training request received from the transmitter 100. Upon receiving the delay information, the transmitter 100 may define the operation of (or "set") the driver control logic 120 in accordance with the delay information. For example, the transmitter 100 may set at least one unit (e.g., a register) corresponding to the clock/data delay control unit 121, the slew control unit 122, and/or the driving strength control unit 123 according to the data pattern (S14).

During data transmission, the transmitter 100 may determine the data pattern (S15), and may accordingly control a timing related to data output in response to the data pattern (S16). Here, the timing control may include clock/data delay control, slew control, and/or driving strength control in response to the determined data pattern.

The transmitter 100 may then transmit data to the receiver 200 through one or more transmission lines using the defined control timing (S17).

In some embodiments, first data transmitted via the first transmission line TL1, second data transmitted via the second transmission line TL2, and third data transmitted via a third transmission line TL3 may be received at the receiver 200, and data pattern information DQPI corresponding to the second transmission line TL2 may be output in relation to the first data, the second data and/or the third data.

In this regard as noted above, timing control with respect to the transmission lines TL1, TL2 and TL3 may be performed by variously controlling clock/data delay, controlling slew of one or more output drivers, and/or controlling driving strength of one or more output driver(s) in response to the data pattern information DQPI.

In some embodiments, when the data pattern information DQPI indicates the even mode, a corresponding output driver may be controlled so that data is transmitted faster than data output in the static mode in the receiver. Here, the even mode may indicate that transition directions of data transmitted in adjacent data transmission lines among the data transmission lines are the same, whereas the static mode may indicate that one or both of the two adjacent data transmission lines does not transition.

In some embodiments, when the data pattern information indicates the odd mode, a corresponding output driver may be controlled so that data is transmitted slower than data output in the static mode in the receiver. Here, the odd mode may indicate that transition directions of data transmitted in adjacent data transmission lines among the data transmission lines are different from each other.

Accordingly, the data communication device 10 of FIGS. 2 to 5B may determine timing compensation in response to a data pattern using a training operation, and may thereafter perform timing compensation in response to the data pattern detected during data transmission, thereby minimizing signal jitter due to crosstalk.

With reference to FIGS. 2 to 5B, the timing of a particular driver (e.g., TD1, TD2 and TD3) of the transmitter 100 may be effectively controlled in response to a data pattern associated with one or more of the drivers and corresponding transmission lines.

Figure 7:
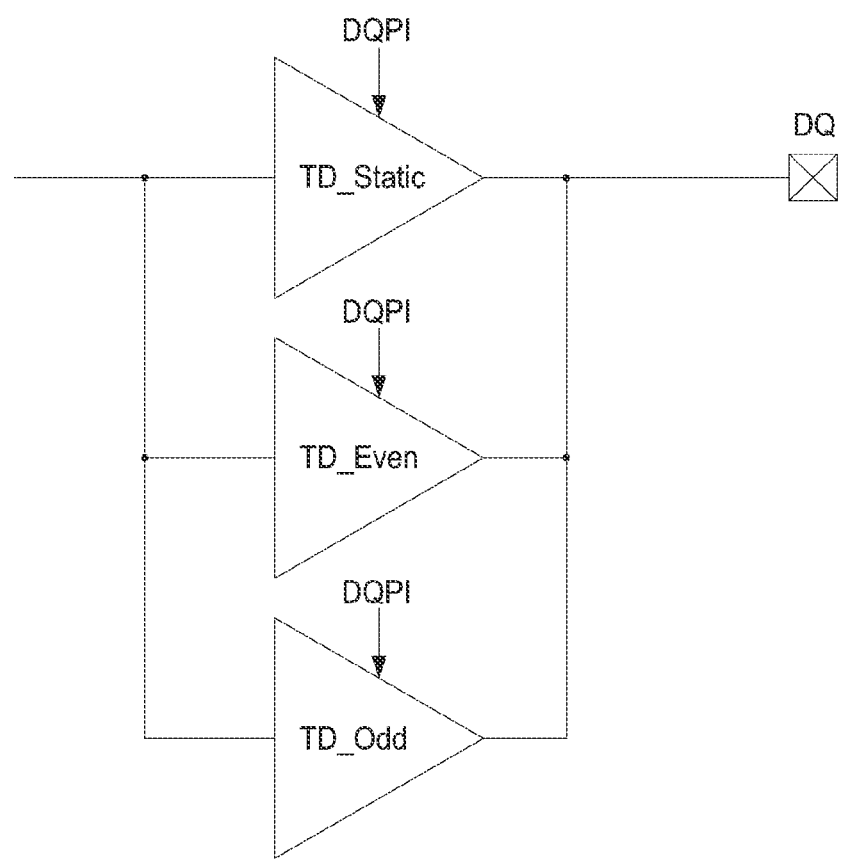
FIG. 7 is a block diagram further illustrating in one example an output driver TD that may be selectively activated in response to data pattern information DQPI.

FIG. 7 is a block diagram further illustrating in one example an output driver TD that may be selectively activated in response to data pattern information DQPI.

Referring to FIG. 7, the output driver TD (e.g., as one possible example of output drivers TD1, TD2 and/or TD3 of FIG. 2) may include a static output driver TD_Static, an even output driver TD_Even, and an odd output driver TD_Odd that may be selectively activated in response to the data pattern information DQPI, wherein the data DQ may be output by the transmitter 100 using the activated output driver.

Figure 8:
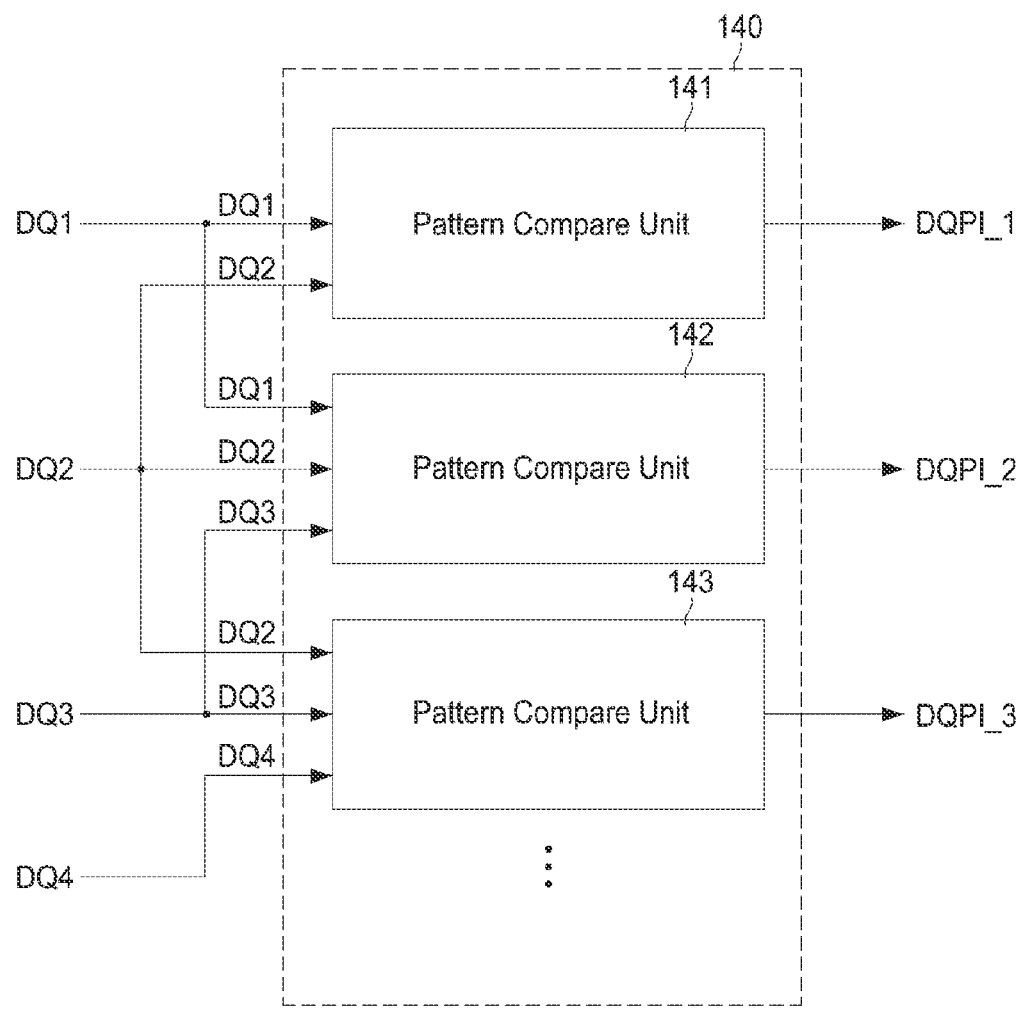
FIG. 8 is a bock diagram further illustrating the a data pattern detector 140 of FIG. 2.

FIG. 8 is a block diagram further illustrating in one example the data pattern detector 140 of FIG. 2. Referring to FIG. 8, the data pattern detector 140 may include multiple pattern compare units (e.g., 141, 142, and 143) respectively corresponding to transmission lines respectively communicating at least one first data DQ1, second data DQ2 and third data DQ3.

For example, the first pattern compare unit 141 may output first data pattern information DQPI_1 associated with the first data DQ1 communicated via the first data transmission line and the second data DQ2 communicated via the second data transmission line. The second pattern compare unit 142 may output second data pattern information DQPI_2 associated with the first data DQ1, the second data DQ2 and third data DQ3 communicated via the third data transmission line. Third pattern compare unit 143 may output third data pattern information DQPI_3 associated with the second data DQ2, the third data DQ3, and fourth data DQ4 transmitted communicated via a fourth data transmission line.

Figure 9A:
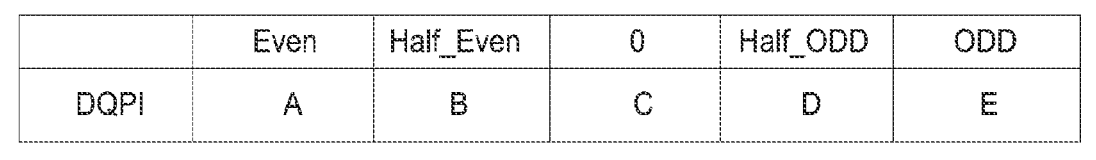

FIGS. 9A and 9B are respective conceptual diagrams illustrating a control table related to data pattern information DQPI associated with a pattern compare unit according to embodiments of the inventive concept.

Referring to FIG. 9A, data pattern information DQPI may be classified in relation to one of five (5) possible modes A, B, C, D, and E, wherein a first mode 'A' is an even mode, a second mode 'B' is a half-even mode, a third mode 'C' is a static mode, a fourth mode 'D' is a half-odd mode, and a fifth mode 'E' is an odd mode.

In a case wherein a data pattern information associated with the second data transmission line DQ_N is output, the even mode indicates that transition directions of the first data transmission line, the second data transmission line and the third data transmission line (DQ_N−1, DQ_N, and DQ_N+1) are the same.

In a case wherein the data pattern information associated with the second data transmission line DQ_N is output, the half-even mode indicates that any one of the transition direction of the first data transmission line DQ_N−1 and the transition direction of the third data transmission line DQ_N+1 is the same as the transition direction of the second data transmission line DQ_N, and the other of the first data transmission line DQ_N−1 and the third data transmission line DQ_N+1 does not transition.

In a case wherein the data pattern information associated with the second data transmission line DQ_N is output, the static mode indicates that any one of the transition direction of the first data transmission line DQ_N−1 and the transition direction of the third data transmission line DQ_N+1 is different from the transition direction of the second data transmission line DQ_N, the transition direction of the other among the first data transmission line DQ_N−1 and the third data transmission line DQ_N+1 is the same as the transition direction of the second data transmission line DQ_N, the first data transmission line DQ_N−1 and the third data transmission line DQ_N+1 may not transition, or the second data transmission line DQ_N may not transition.

In a case wherein the data pattern information associated of the second data transmission line DQ_N is output, the half-odd mode indicates that any one of transition direction of the first data transmission line DQ_N−1 and the transition direction of the third data transmission line DQ_N+1 is different from the transition direction of the second data transmission line DQ_N, and the other of the first data transmission line DQ_N−1 and the third data transmission line DQ_N+1 does not transition.

In a case wherein the data pattern information associated with the second data transmission line DQ_N is output, the odd mode indicates that the transition directions of the first data transmission line DQ_N−1 and the third data transmission line DQ_N+1 are different from the transition direction of the second data transmission line DQ_N.

Thus, the first mode A indicates that the transition direction of three transmission lines is the same; the second mode B indicate that the transition direction of two of the three transmission lines is the same; the third mode C indicates that two of the three transmission lines do not transition; the fourth mode D indicates that transition directions of two of three transmission lines are different; and the fifth mode E indicates that the transition directions of three lines are different.

Referring to FIG. 9B in the context of the illustrated embodiment of FIG. 8, data pattern information (DQPI; DQ_N_Control) may be expressed in terms of data inputs DQ_N−1, DQ_N, DQ_N−1, where 'N' is a positive integer over a predetermined time ($t_0 t_1$, e.g., 2 clocks) provided by the pattern compare units 141, 142 and 143 of the data pattern detector 140. For example, as shown in FIG. 9B, when (N−1)-th data DQ_N−1 is received as '00', N-th data DQ_N is received as '01', and (N+1)-th data DQ_N+1 is received as '00', the corresponding pattern compare units may output data pattern information DQPI corresponding to the third mode C.

From the foregoing example, those skilled in the art will appreciate that the data pattern information DQPI may alternately be classified according to fewer than five modes, or greater than five modes.

Figure 10:
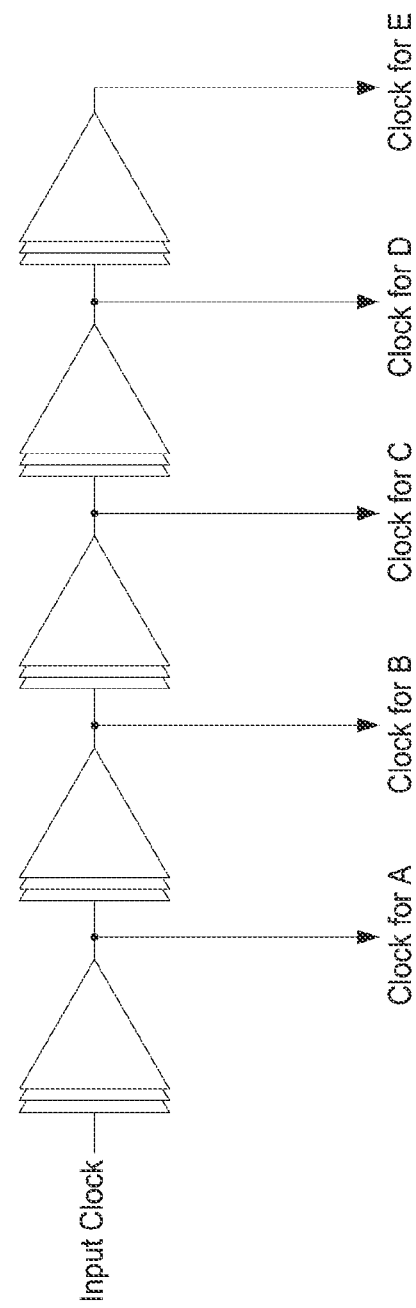
FIG. 10 is a block diagram illustrating a clock delay according to a mode corresponding to data pattern information DQPI according to embodiments of the inventive concept.

FIG. 10 is a block diagram illustrating a clock delay according to a mode corresponding to data pattern information DQPI according to embodiments of the inventive concept. Referring to FIG. 10, clocks corresponding to the modes A, B, C, D, and E according to a data pattern may be variously generated. For example, when the data pattern information DQPI output from a pattern compare unit is the first mode A, a fastest clock may be output. Alternately, when the data pattern information DQPI output from a pattern compare unit is the fifth mode E, a slowest clock may be output.

Figure 11A:
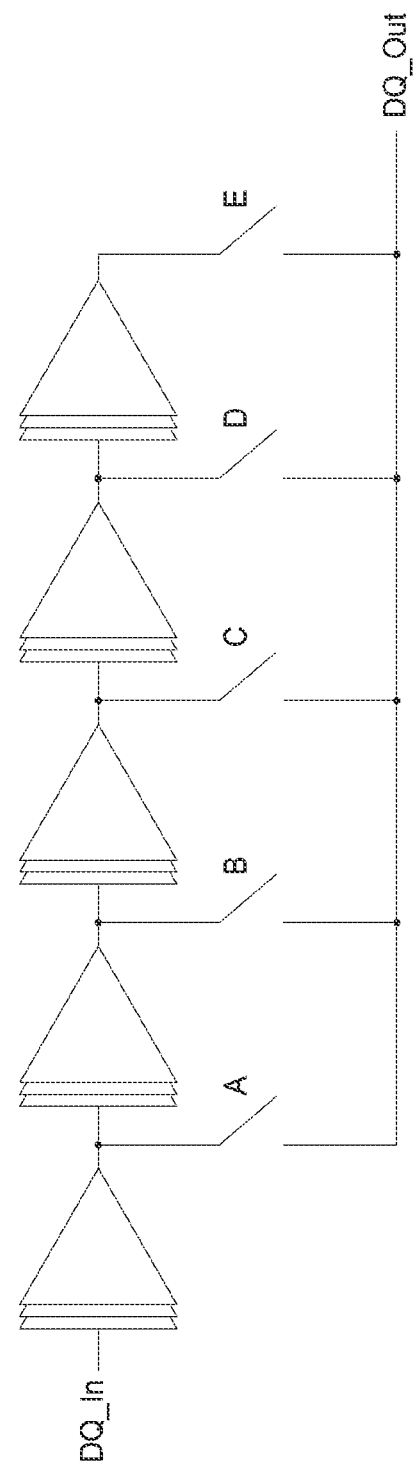
FIGS. 11A, 11B, and 11C are respective block diagrams illustrating data delay according to a mode corresponding to data pattern information DQPI.
Figure 11B:
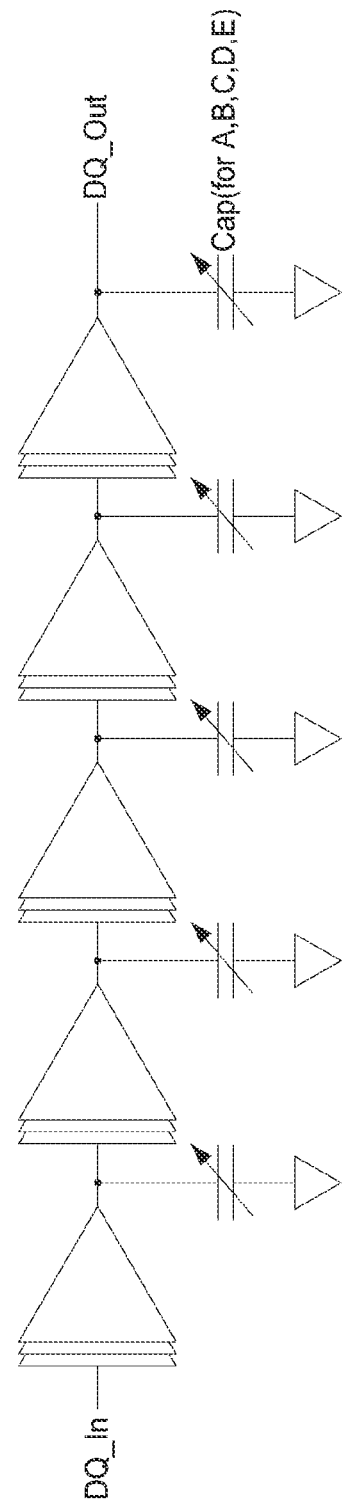
Figure 11C:
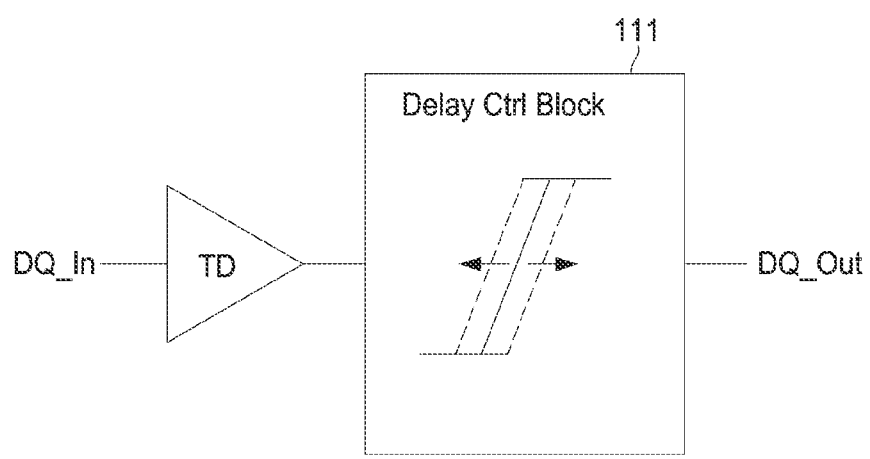

FIGS. 11A, 11B, and 11C are respective block diagram illustrating clock/data delay according to a mode corresponding to data pattern information DQPI.

Referring to FIG. 11A, input data DQ_In may be output as output data DQ_Out through multiple delay elements. Here, in the first mode A, a delay element corresponding to the smallest data delay may be selected, and in the fifth mode F, a delay element corresponding to the largest data delay may be selected.

Referring to FIG. 11B, a capacitance value of a transmission line may vary according to modes A, B, C, D, and E. Since a difference in data delay occurs depending on the capacitance value, in the case of the first mode A, a capacitance value corresponding to the smallest data delay may be selected, and in the case of the fifth mode F, a capacitance value corresponding to the largest data delay may be selected.

Referring to FIG. 11C, data DQ_Out may be output by delaying an output of an output driver which delays based on a delay control block 111 that delays the output by an amount corresponding to the mode.

Figure 12:
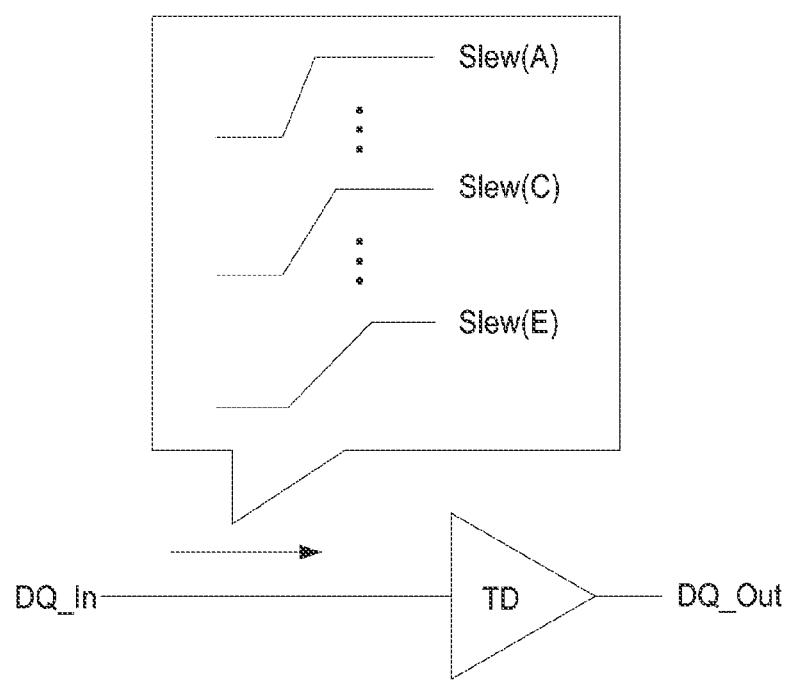
FIG. 12 is a block diagram illustrating slew control according to a mode corresponding to data pattern information DQPI according to embodiments of the inventive concept.

FIG. 12 is a block diagram illustrating slew control according to a mode corresponding to data pattern information DQPI according to embodiments of the inventive concept. Referring to FIG. 12, slew may be adjusted according to a mode, and data DQ_In may be received by the output driver TD based on the adjusted slew.

Figure 13:
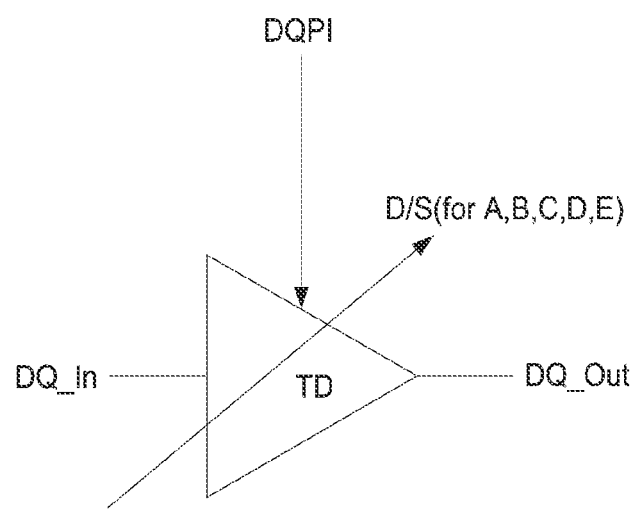
FIG. 13 is a block diagram illustrating driving strength control according to a mode corresponding to data pattern information DQPI according to embodiments of the inventive concept.

FIG. 13 is a block diagram illustrating driving strength control according to a mode corresponding to the data pattern information DQPI according to embodiments of the inventive concept. Referring to FIG. 13, driving strength D/S may vary according to modes A, B, C, D, and E corresponding to the data pattern information DQPI. The output driver TD may receive the input data DQ_In and output the data DQ_Out with an optimal driving strength D/S according to a mode.

With the foregoing in mind, it should be noted that a communication device according to embodiments of the inventive concept may be variously implemented in many different electronic products.

Figure 14:
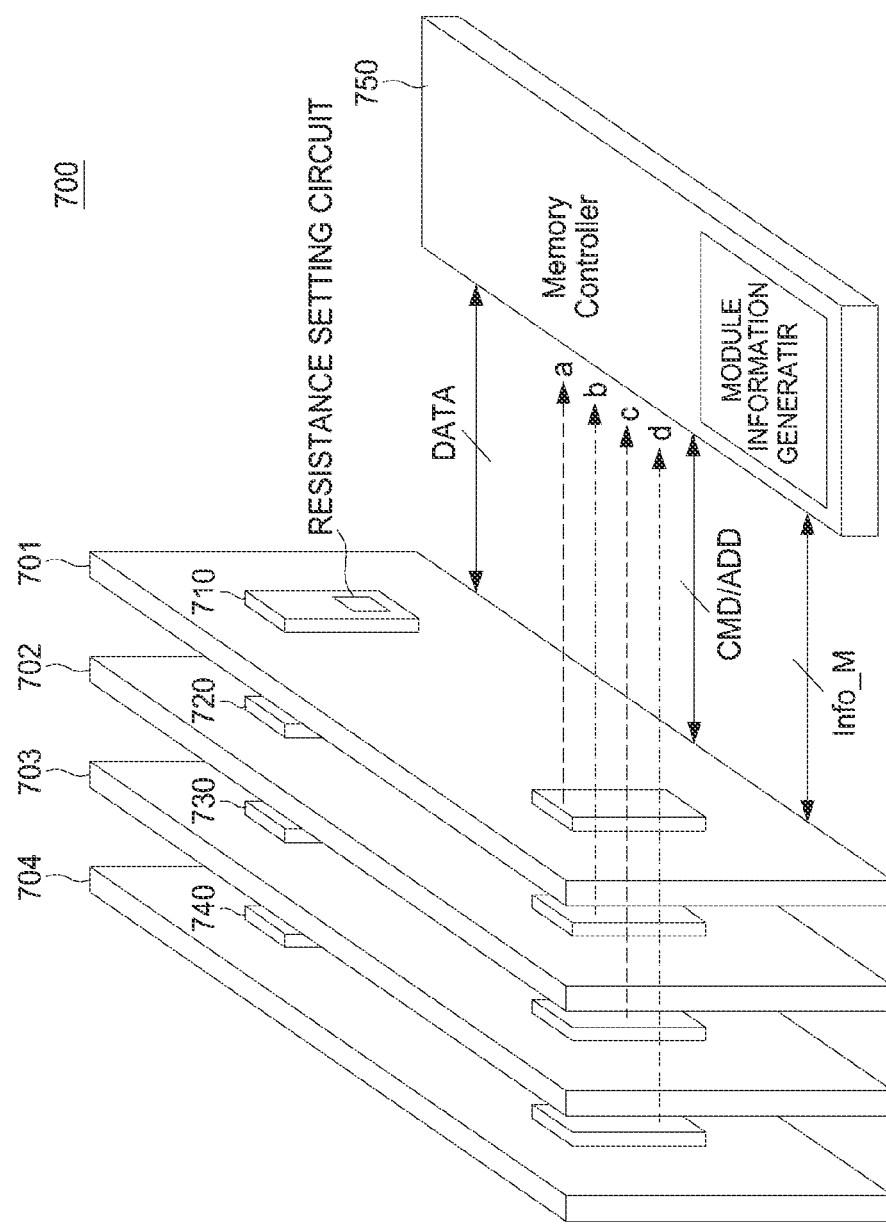
FIG. 14 is an exploded block diagram illustrating a memory system according to embodiments of the inventive concept.

FIG. 14 is a block diagram illustrating a memory system 700 according to embodiments of the inventive concept. Referring to FIG. 14, the memory system 700 may include a memory controller 750 and a number of memory modules (e.g., 701, 702, 703 and 704).

The memory controller 750 for each of the memory modules 701, 702, 703 and 704 may be implemented to control clock/data delay, slew, and/or driving strength of data transmission lines according to a data pattern during data transmission as described above.

In some embodiments, each of the memory modules 701, 702, 703 and 704 may be implemented as a single in-line memory module (SIMM) or a dual in-line memory module (DIMM).

The memory controller 750 and the memory modules 701, 702, 703 and 704 may be mounted on a system board and may communicate (i.e., transmit and/or receive data) DATA, along with command(s) CMD and/or address(es) ADD via various transmission lines (e.g., wiring) laid out on the system board.

Memory devices included in the memory system 700 may variously arranged in ranks. For example, memory devices mounted on different memory modules may be defined as being included in different ranks. Alternately, among the memory devices mounted on the same memory module, a memory device mounted on one side of a module board and a memory device mounted on the other side of the module board may be defined to be included in different ranks. Positions in which the first to fourth memory modules 701 to 704 are mounted in the system board may be different, and accordingly, the memory devices of different ranks may communicate data to/from the memory controller 750 over different physical distances.

The respective resistances of the data transmission lines (or paths) between the first, second, third and fourth memory modules 701, 702, 703 and 704 and the memory controller 750 may be different. In some embodiments, a physical distance between the first memory module 701 and the memory controller 750 may be relatively short, while a physical distance between the fourth memory module 704 and the memory controller 750 may be relatively long. Accordingly, a training operation according to a data pattern may be performed for each memory module, and an optimal timing control may be performed before data transmission according to a performing result.

Other embodiments of the inventive concept may be applied to a dual-mode transceiver.

Figure 15:
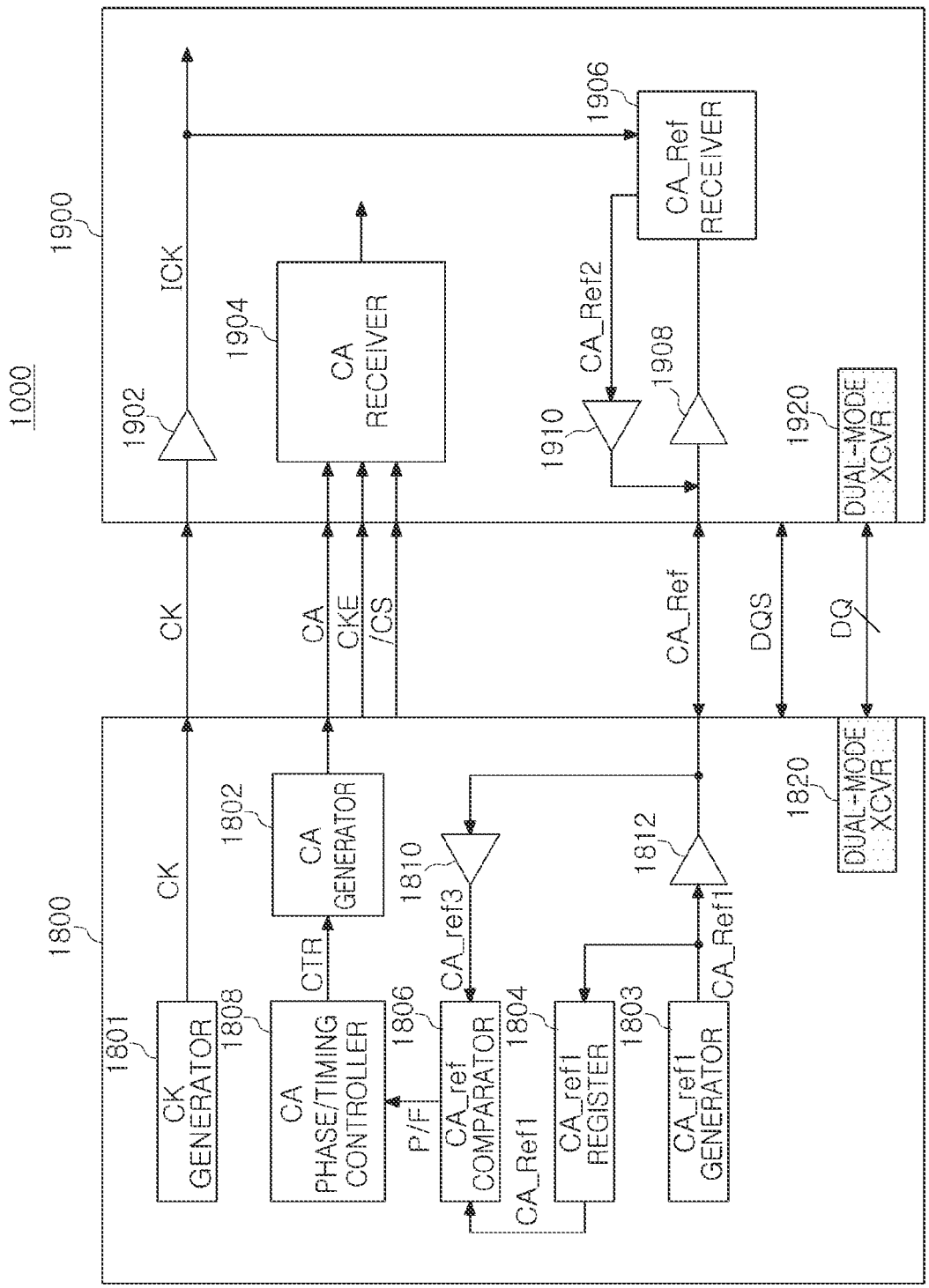
FIG. 15 is a block diagram illustrating a computing system according to embodiments of the inventive concept.

FIG. 15 is a block diagram illustrating a computing system 1000 according to embodiments of the inventive concept. Referring to FIG. 15, the computing system 1000 may include a controller 1800 and a memory device 1900. The controller 1800 may include a clock generator 1801, command/address (CA) generator 1802, a command/address (CA) reference generator 1803, a register 1804, a comparator 1806, a phase/timing controller 1808, and data input/output (I/O) units 1810 and 1812. The controller 1800 may provide a clock signal CK generated by the clock generator 1801 to the memory device 1900 through a clock signal line.

The computing system 1000 may include a separate command/address reference signal (CA_Ref) line in an interface. The command/address reference signal (CA_Ref) line may serve to transmit and receive a command/address reference signal (CA_Ref), which is a reference value of the command/address, in a calibration mode.

A phase/timing of the command/address signal CA may be adjusted by providing a calibration result value using the reference value of the command/address to the phase/timing controller 1808. Since there is a separate command/address reference signal (CA_Ref) line, it is possible to perform a calibration operation to adjust the phase/timing of the command/address (CA) signal, while simultaneously transmitting the command/address (CA) signal. The CA generator 1802 may generate a command/address signal CA whose phase or timing is adjusted in response to a control signal CTR from the phase/timing controller 1808 and transmit the generated command/address signal CA to the memory device 1900 through a CA bus.

The command/address reference generator 1803 has the same configuration as the command/address generator 1802 and may generate a first command/address reference signal CA_Ref1, which is the same as the command/address signal CA generated by the command/address generator 1802. The first command/address reference signal CA_Ref1 is provided to the register 1804. In addition, the first command/address reference signal CA_Ref1 is transmitted to the CA reference bus through the data output unit 1812 and provided to the memory device 1900 through the CA reference bus 16.

The register 1804 may store the first command/address reference signal CA_Ref1. The comparator 1806 may compare the first command/address reference signal CA_Ref1 stored in the register 1804 with the third command/address reference signal CA_Ref3 output from the data input unit 1810. The comparator 1804 may compare data of the first command/address reference signal CA_Ref1 and the third command/address reference signal CA_Ref3 to generate a pass or fail signal P/F.

The phase/timing controller 1808 may generate a control signal CTR indicating a phase shift of the command/address signal CA according to the pass or fail signal P/F of the comparator 1806. The control signal CTR may adjust a phase or timing of the command/address signal CA to generate a phase-adjusted command/address signal CA.

The data input unit 1810 may receive the second command/address reference signal CA_Ref2 transmitted from the memory device 1900 through the CA reference bus and transfer a third command/address reference signal CA_Ref3. The data output unit 1812 may receive the first command/address reference signal CA_Ref1 generated by the command/address reference generator 1803 and transmit the received signal to the CA reference bus 12.

The memory device 1900 may include a clock buffer 1902, a command/address (CA) receiver 1904, a command/address reference receiver 1906, and data input/output units 1908 and 1910. The clock buffer 1902 may receive a clock signal CK transmitted through a clock signal line and generate an internal clock signal ICK. In response to the internal clock signal ICK, the CA receiver 1904 may receive a chip select signal /CS, a clock enable signal CKE, and a command/address signal CA transmitted through the CA bus.

The clock enable signal CKE may be used as a pseudo command acting as a read command of the command/address signal CA transmitted through the CA bus. The CA receiver 1904 may receive the command/address signal CA when the clock enable signal CKE is active.

The data input unit 1908 may receive the first command/address reference signal CA_Ref1 transmitted from the controller 1800 through the CA reference bus and transmit the received signal to the command/address reference receiver 1906. The command/address reference receiver 1906 may be configured the same as the CA receiver 1904. In response to the internal clock signal ICK, the command/address reference receiver 1906 may receive the chip select signal /CS, the clock enable signal CKE, and the first command/address reference signal CA_Ref1 transferred through the CA reference bus and generate a second command/address reference signal CA_Ref2.

The second command/address reference signal CA_Ref2 may be the same as the signal output by receiving the chip select signal /CS, the clock enable signal CKE, and the command/address signal CA transferred through the CA bus. The second command/address reference signal CA_Ref2 may be transmitted to the CA reference bus through the data output unit 1910.

A calibration operation may be performed in the computing system 1000 as follows. The CA generator 1802 of the controller 1800 may adjust a phase or timing of the command/address signal CA and transmit the command/address signal CA to the CA bus in response to the control signal CTR from the phase/timing controller 1808. The command/address reference generator 1803 may generate a first command/address reference signal CA_Ref1 identical to the command/address signal CA and transfer the first command/address reference signal CA_Ref1 to the CA reference bus.

The CA reference receiver 1906 of the memory device 1900 may receive the first command/address reference signal CA_Ref1 according to the internal clock signal ICK and the clock enable signal CKE and generates the second command/address reference signal CA_Ref2. The second command/address reference signal CA_Ref2 of the memory device 1900 may be transmitted through the CA reference bus.

The controller 1800 may transmit the second command/address reference signal CA_Ref2 transmitted through the CA reference bus to the comparator 1806. The comparator 1806 may compare data of the first command/address reference signal CA_Ref1 and the second command/address reference signal CA_Ref2 and generate a pass or fail signal P/F. The phase/timing controller 1808 may generate a control signal CTR indicating a phase shift of the command/address signal CA according to the pass or fail signal P/F of the comparator 1806. The CA generator 1802 may generate a phase-adjusted command/address signal CA according to the control signal CTR.

By repeating the CA calibration operation, the phase/timing controller 1808 of the controller 1800 may determine the middle of the passed (P) positions as the middle of the command/address signal (CA) window, generate a command/address signal CA so that the middle of the command/address signal CA window comes at the edge of the clock signal CK, and provide the generated command/address signal CA to the memory device 1900. Accordingly, the memory device 1900 may receive the command/address signal CA in which the middle of an effective window is positioned at a rising/falling edge of a clock signal pair CK and CKB at a rising/falling edge of the clock signal CK.

The computing system 1000 according to embodiments of the inventive concept may include dual-mode transceivers 1820 and 1920 in each of the controller 1800 and the memory device 1900.

Each of the dual-mode transceivers 1820 and 1920 may operate in either a non-return to zero (NRZ) transmission mode or a pulse amplitude modulation level 4 (PAM-4) transmission mode. In some embodiments, each of the dual-mode transceivers 1820 and 1920 may be implemented to output data by optimizing the output driver TX in an optimal mode according to a data pattern during data transmission. That is, the transceivers 1820 and 1920 may perform clock/data delay control, slew control, and/or driving strength control according to a mode corresponding to data pattern information as described above in relation to the illustrated embodiments, thereby minimizing crosstalk between the data transmission lines.

Figure 16:
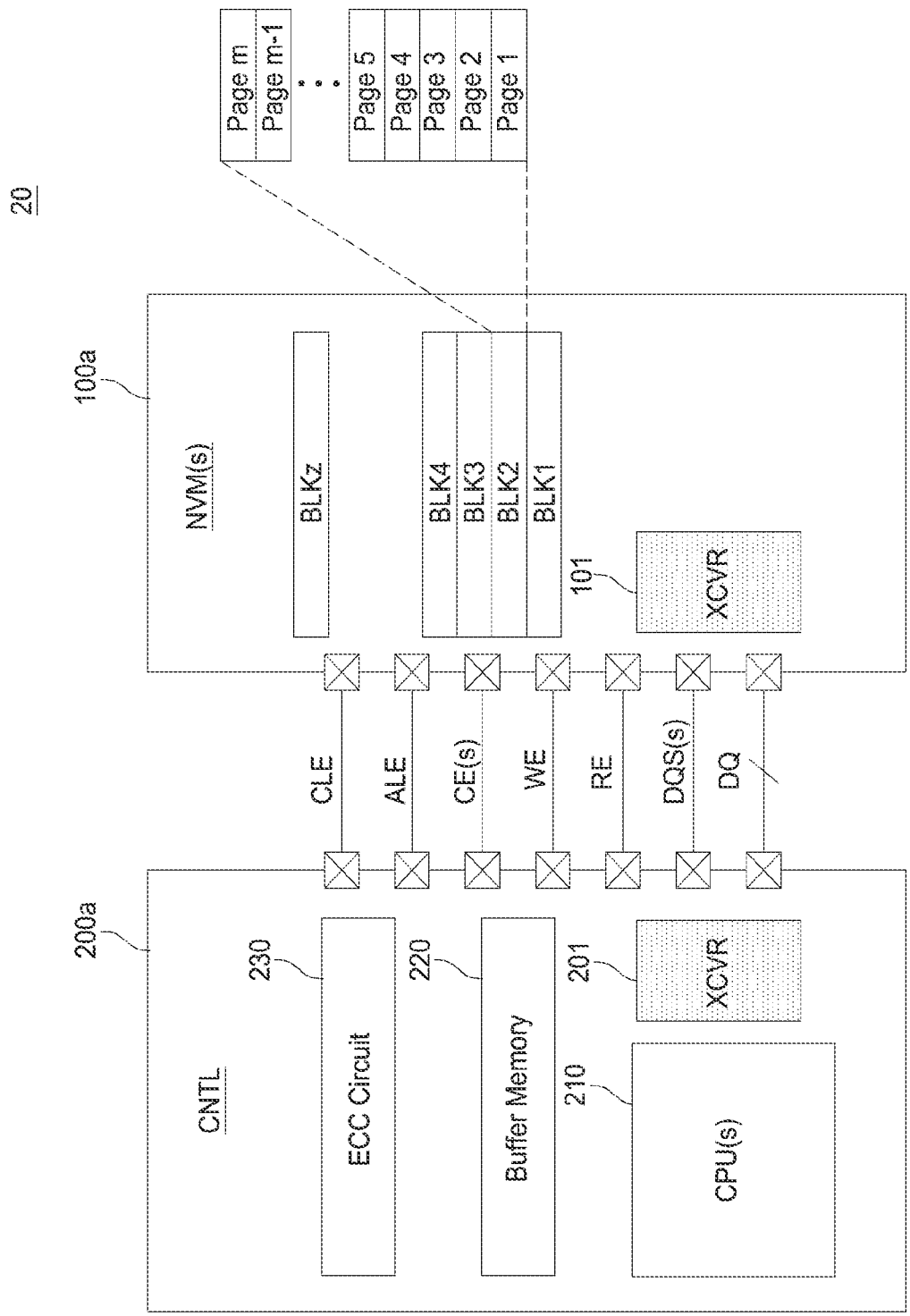
FIG. 16 is a block diagram illustrating a storage device according to embodiments of the inventive concept.

FIG. 16 is a block diagram illustrating a storage device 20 according to embodiments of the inventive concept. Referring to FIG. 16, the storage device 20 may include at least one nonvolatile memory device 100a and a controller 200a controlling same.

At least one non-volatile memory device 100a may be implemented to store data. The nonvolatile memory device 100a may include a NAND flash memory, a vertical NAND flash memory, a NOR flash memory, a resistive random access memory (RRAM), a phase-change memory (PRAM), magnetoresistive random access memory (MRAM), ferro-electric random access memory (FRAM), spin transfer torque random access memory (STT-RAM), etc. Also, the nonvolatile memory device 100a may be implemented as a three-dimensional array structure.

Also, the nonvolatile memory device 100a may be implemented to include a transceiver 101 and multiple memory blocks BLK1 to BLKz, wherein 'z' is an integer greater than 1. Each of the memory blocks BLK1 to BLKz may include multiple pages (e.g., Page 1 to Page m, where 'm' is an integer greater than 1). Each of the pages Page 1 to Page m may include memory cells configured to store at least one bit.

The controller (CNTL) 200a may be connected to the at least one non-volatile memory device 100a through control pins configured to transmits control signals (e.g., CLE, ALE, CE(s), WE, RE, etc.). Also, the controller 200a may be implemented to control the nonvolatile memory device 100a using the control signals CLE, ALE, CE(s), WE, and RE. For example, the nonvolatile memory device 100 may perform a program operation/read operation/erase operation by latching a command or an address at an edge of a write enable (WE) signal according to a command latch enable (CLE) signal and an address latch enable (ALE) signal.

The controller 200a may be implemented to control the overall operation of the storage device 20. The controller 200a may perform various management operations such as cache/buffer management, firmware management, garbage collection management, wear leveling management, data duplication removal management, read refresh/reclaim management, bad block management, multi-stream management, management of mapping of host data and non-volatile memory, quality of service (QoS) management, system resource allocation management, non-volatile memory queue management, read voltage level management, erase/program management, hot/cold data management, power loss protection management, dynamic heat management, initialization management, and redundant array of inexpensive disk (RAID) management.

In addition, the controller 200a may include a transceiver 201, at least one processor (CPU) 210, a buffer memory 220, and an error correction code (ECC) circuit 230.

At least one processor (CPU) 210 may be implemented to control an overall operation of the storage device 20.

The buffer memory 220 may be implemented as a volatile memory (e.g., a static random access memory (SRAM), a dynamic RAM (DRAM), a synchronous RAM (SDRAM), etc.) or A non-volatile memory (a flash memory, a phase-change (PRAM), a magneto-resistive RAM (MRAM), a resistive RAM (ReRAM), a ferro-electric RAM (FRAM), etc.). The buffer memory 220 may include a plurality of tables 221, 222, and 223.

The ECC circuit 230 may be implemented to generate an error correction code (ECC) during a program operation and to recover data using the ECC during a read operation. That is, the ECC circuit 230 may generate an ECC for correcting a fail bit or an error bit of data received from the nonvolatile memory device 100a. The ECC circuit 230 may form data to which a parity bit is added by performing error correction encoding of data provided to the nonvolatile memory device 100a. The parity bit may be stored in the nonvolatile memory device 100a. Also, the ECC circuit 230 may perform error correction decoding on data output from the nonvolatile memory device 100a. The ECC circuit 230 may correct an error using parity. The ECC circuit 230 may correct an error using a low density parity check (LDPC) code, a BCH code, a turbo code, a Reed-Solomon code, a convolution code, and a recursive systematic code (RSC) or coded modulation such as trellis-coded modulation (TCM) or block coded modulation (BCM).

The transceiver (XCVR) 101 of the non-volatile memory device 100a and the transceiver (XCVR) 201 of the controller 200a may perform clock/data delay control, slew control, or driving strength control on each of the transmission line optimally according to a data pattern as described above with reference to FIGS. 1 to 13.

Figure 17:
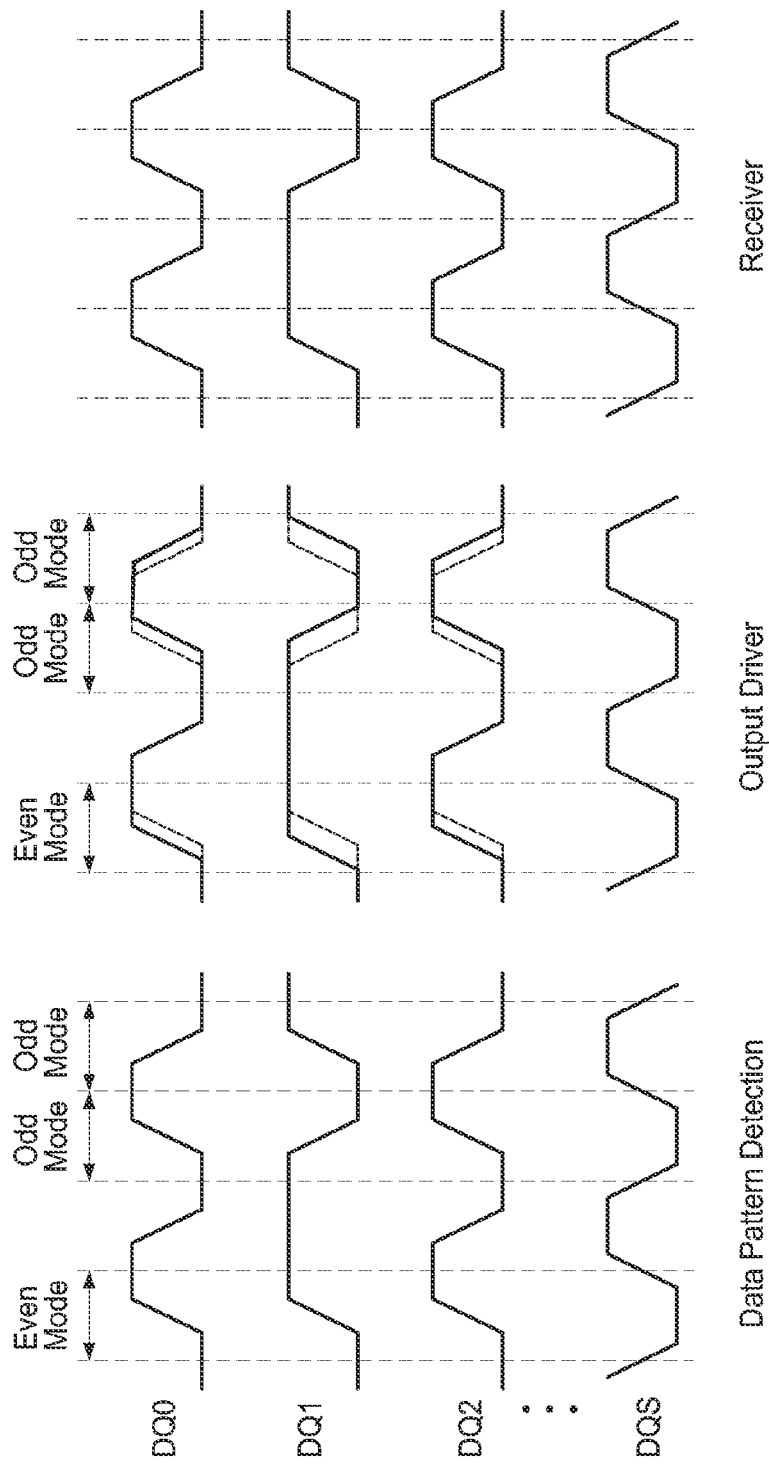
FIG. 17 is a waveform diagram illustrating waveforms of data transmission lines according to embodiments of the inventive concept.

FIG. 17 is a collection of waveform diagrams illustrating signal waveforms of data transmission lines according to embodiments of the inventive concept. Referring to FIG. 17, when data DQ0, DQ1, and DQ2 is transmitted in synchronization with DQS, the output driver may output such that a timing is shifted slightly forward from the original waveform in the case of the even mode and a timing is shifted slightly backward from the original waveform in the case of the odd mode according to detection of a data pattern.

Accordingly, the original waveform may be received by the receiver without causing jitter according to the transmission line.

Figure 18A:
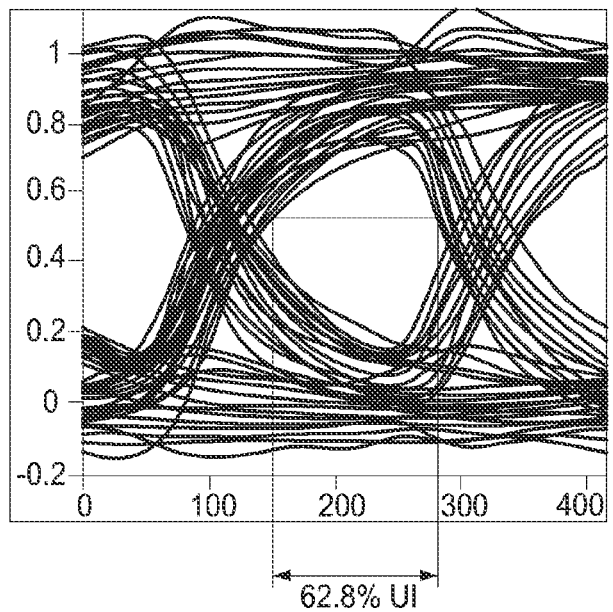
FIGS. 18A and 18B are respective eye diagrams comparatively illustrating crosstalk effects between embodiments of the inventive concept and comparative examples.
Figure 18B:
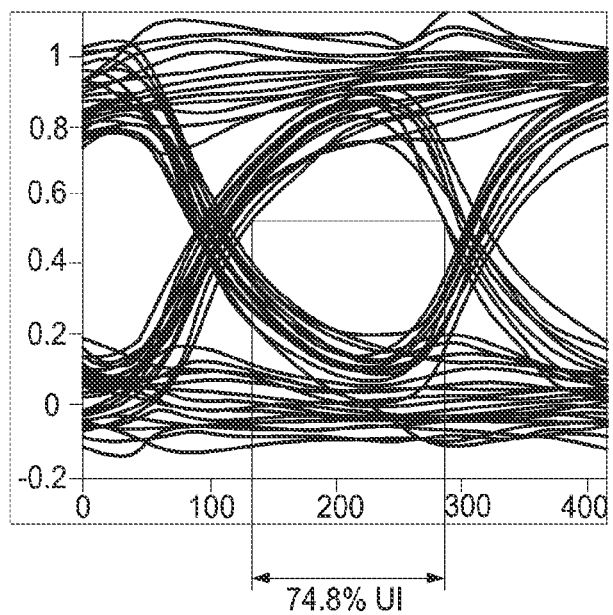

FIGS. 18A and 18B are respective eye pattern diagrams comparatively illustrating crosstalk effects for an embodiment of the inventive concept in relation to a comparative (non-inventive) example. As shown in FIG. 18A a comparative communication device may output an eye pattern having a unit interval (UI) of about 62.8%, while under similar operating conditions a communication device according to an embodiment of the inventive concept outputs an eye pattern having a UI of about 74%. That is, a DQ eye margin may be improved by about 12% between these two example.

A data communication device according to embodiments of the inventive concept may significantly improve an eye pattern, as compared with such comparative examples. Thus, in certain embodiments of the inventive concept, in order to compensate for a reduction of a DQ setup/hold time margin appearing due to a difference in a propagation delay of a channel in even/odd patterns in a printed circuit board (PCB) environment, delay/slew/driving strength are controlled and transmitted by patterns in the driver, and a pattern dependent control logic may be configured in a transmitter.

In the case of storage products with a PCB channel environment (SSD, eStorage, etc.), an increase in interface speed is essential to satisfy high capacity/high speed performance. In particular, parallel communication is essential to increase bandwidth when communicating with a controller and NAND flash memory or dynamic random access memory (DRAM) unit and Interface (I/F) communication. In parallel communication, there are many DQ signals, so a propagation speed of waveforms is different depending on the even/odd mode between adjacent DQ signals. This makes an arrival time between DQ signals/patterns different from a clock at a receiving end, limiting a high-speed operation due to a reduction in the eye time margin. Embodiments of the inventive concept provide a solution that overcomes the I/F limit in a way that compensates for even and odd delay mismatch. Embodiments of the inventive concept, during device-to-device communication, data is transmitted by controlling delay/slew/driving strength, and the like from a driver to compensate for an even/odd crosstalk influence between DQs that occurs in a channel. Inside a transmitter device, a block for comparing even/odd patterns and a block for controlling the delay/slew/driving strength exist. Through this, a signal deterioration phenomenon caused by a channel is compensated and the eye time margin is improved.

As set forth above, transmitters, data communication devices including same, and related data transmission methods according to embodiments of the inventive concept may reduce jitter due to crosstalk in a receiver by performing timing control according to a data pattern as transmitted by the transmitter.

While embodiments of the inventive concept have been shown and described above, it will be apparent to those skilled in the art that modifications and variations may be made without departing from the scope of the inventive concept as defined by the following claims.

What is claimed is:

1. A transmitter comprising:
   output drivers respectively corresponding to data transmission lines;
   driver control logic configured to control the output drivers in response to data pattern information; and
   a data pattern detector configured to detect a data pattern in relation to at least two data transmission lines among the data transmission lines over a predetermined period of time, and output the data pattern information corresponding to the data pattern.

2. The transmitter of claim 1, wherein the data pattern information includes:
   even mode information in which transition direction of the at least two data transmission lines is the same;
   odd mode information in which transition directions of the at least two data transmission lines are different; and
   static mode information in which one of the at least two data transmission lines does not transition.

3. The transmitter of claim 1, wherein the at least two data transmission lines includes a first data transmission line, a second data transmission line, and a third data transmission line, wherein the second data transmission line is adjacent to the first data transmission line on one side and adjacent to the third data transmission line on another side, and
   the data pattern information corresponding to the second data transmission line includes at least one of:
   (1) even mode information in which a transition direction of the first data transmission line, the second data transmission line and the third data transmission line is the same;
   (2) odd mode information in which a transition direction of the first data transmission line and the third data transmission line is different than a transition direction of the second data transmission line;
   (3) half even mode information in which a transition direction of one of the first data transmission line and the third data transmission line is the same as a transition direction of the second data transmission line, and another one of the first data transmission line and the third data transmission line does not transition;
   (4) half odd mode information in which a transition direction of one of the first data transmission line and the third data transmission line is different from a transition direction of the second data transmission line, and another one of the first data transmission line and the third data transmission line does not transition; and
   (5) static mode information in which transition directions of the first data transmission line, the second data transmission line and the third data transmission line are different.

4. The transmitter of claim 1, wherein the data pattern detector includes pattern compare units respectively corresponding to the data transmission lines.

5. The transmitter of claim 1, wherein the data pattern detector includes a delay control unit configured to delay a clock/data signal related to the output drivers in response to the data pattern information.

6. The transmitter of claim 1, wherein the data pattern detector includes a slew control unit configured to control slew of a signal related to the output drivers in response to the data pattern information.

7. The transmitter of claim 1, wherein the data pattern detector includes a driving strength control unit configured to control driving strength of a signal related to the output drivers in response to the data pattern information.

8. The transmitter of claim 1, wherein each of the output drivers includes one output driver activated in response to the data pattern information, and another output driver deactivated in response to the data pattern information.

9. The transmitter of claim 1, wherein the data pattern detector includes a first pattern compare unit receiving first data from a first data transmission among the data transmission lines, a second pattern compare unit receiving second data from a second data transmission among the data transmission lines, and a third pattern compare unit receiving third data from a third data transmission among the data transmission lines, and the data pattern detector outputs the data pattern information in relation to at least one of the first data, the second data, and the third data.

10. The transmitter of claim 9, wherein the data pattern information is determined in accordance with predetermined table information.

* * * * *